US005916353A

United States Patent [19]

Bennett et al.

[11] Patent Number: 5,916,353

[45] Date of Patent: Jun. 29, 1999

[54] DOMESTIC OVEN ADAPTED FOR USE IN DEHYDRATING FOOD PRODUCTS

[75] Inventors: Perry A. Bennett, Cleveland; Kenneth E. Sauter, Ooltewah, both of Tenn.

[73] Assignee: Maytag Corporation, Newton, Iowa

[21] Appl. No.: 09/014,682

[22] Filed: Jan. 28, 1998

[51] Int. Cl.[6] .......................... A47J 37/04

[52] U.S. Cl. .......................... 99/474; 99/467; 126/19 R; 126/190; 126/273 R

[58] Field of Search .......................... 99/474, 476, 467, 99/483, 385; 126/19 R, 190, 273 R

[56] References Cited

U.S. PATENT DOCUMENTS

| | | | |
|---|---|---|---|
| 1,979,210 | 10/1934 | Rogers | 126/190 |
| 2,668,221 | 2/1954 | McCormick | 126/190 |
| 3,132,638 | 5/1964 | Habe et al. | 126/19 R |
| 4,082,077 | 4/1978 | Marfatia et al. | 126/197 |
| 4,143,592 | 3/1979 | Kuest et al. | 99/483 |
| 4,188,867 | 2/1980 | DeRemer | 99/385 |
| 4,531,306 | 7/1985 | Erickson | 99/483 X |
| 4,835,351 | 5/1989 | Smith et al. | 219/400 |
| 5,025,776 | 6/1991 | Hanley et al. | 126/194 |
| 5,027,787 | 7/1991 | Gorton | 126/21 R |
| 5,417,148 | 5/1995 | Cavallo | 99/334 |

*Primary Examiner*—Reginald L. Alexander
*Attorney, Agent, or Firm*—Everett G. Diederiks, Jr.

[57] ABSTRACT

An oven is provided with structure which maintains a door, adapted to extend across and seal against an open frontal portion of a heating cavity of the oven, slightly ajar from a fully closed position so as to just break a seal between the door and the oven cavity in order to enable moisture to escape the oven cavity when utilizing the oven for dehydrating food products. For this purpose, the oven incorporates a spacer element that is movable between a de-activated position, wherein the oven can be used in a conventional manner, and an activated position for use in a drying mode of operation. In a preferred embodiment of the invention, a pivotally mounted spacer element is positioned between the door and a cabinet portion of the oven for movement between the de-activated and activated positions. In this preferred embodiment, the spacer element is automatically movable from the activated to the de-activated position due to gravity upon the opening of the door. The oven also includes a control system for establishing the drying mode of operation and inputting a desired dehydration temperature. In addition, the control system includes an arrangement for overriding the desired dehydration temperature if the set temperature is outside a predetermined temperature range by establishing a predetermined default temperature.

25 Claims, 4 Drawing Sheets

DOMESTIC OVEN ADAPTED FOR USE IN DEHYDRATING FOOD PRODUCTS

BACKGROUND OF THE INVENTION

1. Field of the Invention

The present invention pertains to the art of domestic appliances and, more particularly, to an oven that is designed for use in dehydrating food products.

2. Discussion of the Prior Art

Dehydrated food products have become extremely popular as such products represent vitamin enriched nutritional sources that can be conveniently packaged for consumption over extended periods of time. In general, dehydrated food products are produced by heating food, such as fruits, vegetables and herbs, within a chamber at a relatively low temperature over extended periods of time, while allowing moisture to escape the chamber, thereby drying out the food. Although the most effective drying time and temperature will differ between various foods, for example, from 1–3 hours at approximately 100° F. for most herbs to anywhere from 1–36 hours at a slightly higher temperature for various fruits ranging from orange and lemon peels to apples, bananas and nectarines, all dehydration processes generally operate based on this same common principle.

Due to increasing consumer demand for dehydrated food products, units specifically designed for dehydrating fruits, vegetables, herbs and the like have been introduced into the marketplace in order to enable consumers to personally dehydrate the food products. Of course, the purchasing of a specialized device for this purpose can represent an undesirable investment, particularly if the consumer does not desire such food products on a regular basis. Therefore, supermarkets and various nutritional stores still represent the main sources for these products.

Based on the above, it is a general object of the present invention to adapt a conventional, domestic oven for use in effectively dehydrating food products, thereby enabling consumers to readily prepare dehydrated food products in their own households in an efficient, economical and safe manner.

More specifically, it is an object of the present invention to provide a domestic oven designed for use in a drying mode of operation wherein food items placed within a cavity of the oven can be heated at a relatively low temperature and for prolonged periods of time, while humid air is permitted to escape the cavity, in order to prepare dehydrated food products.

SUMMARY OF THE INVENTION

These and other objects of the present invention are achieved by providing a domestic oven, including an oven cavity which defines an open frontal portion that is adapted to be selectively closed by a pivotally mounted door, with a drying mode of operation in which food items can be dehydrated. To effectively accomplish the drying mode of operation, manual setting elements are incorporated for use in selecting the mode of operation, a desired operating temperature and the duration of the drying operation. In addition, a spacer arrangement is provided for maintaining the door slightly ajar from a fully closed position so as to just break a seal between the door and the oven cavity in order to enable the escape of moisture from the cavity, while substantially retaining the heat therein.

In further accordance with the invention, enhanced control and safety features are also incorporated. For instance, a selected operating temperature override is provided in order to automatically establish a safe and effective operating temperature if the selected operating temperature is outside a predetermined range, such as 100° F. –200° F. In addition, the preferred embodiment provides for the spacer arrangement to automatically shift from an activated position, wherein the door is prevented from being sealed against the open frontal portion of the oven cavity, to a de-activated position, wherein the door is permitted to assume the fully closed position, upon opening of the door.

When applied to a floor supported, range-type domestic oven in accordance with a preferred embodiment of the invention, the spacer arrangement takes the form of a bracket having a first leg pivotally attached to a cabinet of the oven and a second leg arranged between the door and a frontal surface section of a side panel of the cabinet. In this embodiment, the second leg of the spacer bracket can be arranged substantially parallel to the frontal surface section of the side panel when in the de-activated position and project outward from the frontal surface section, towards the door, when pivoted to the activated position. Manually closing the door while holding the spacer bracket in the activated position assures that the seal between the door and the oven cavity will be broken for the dehydrating process. By enabling a smooth pivoting operation and positioning the second leg of the spacer bracket vertically above the first leg when the spacer bracket is in the activated position, the spacer bracket will automatically shift to the de-activated position, due to gravity, upon opening of the door.

Based on the above, it should be readily apparent that the present invention provides a simple and efficient system that enables a domestic oven to be used in dehydrating food products at minimal increased cost. In any event, these and other objects, features and advantages of the present invention will become more readily apparent from the following detailed description of a preferred embodiment thereof, when taken in conjunction with the drawings wherein like reference numerals refer to corresponding parts in the several views.

DETAILED DESCRIPTION OF THE PREFERRED EMBODIMENT

Figure 1:
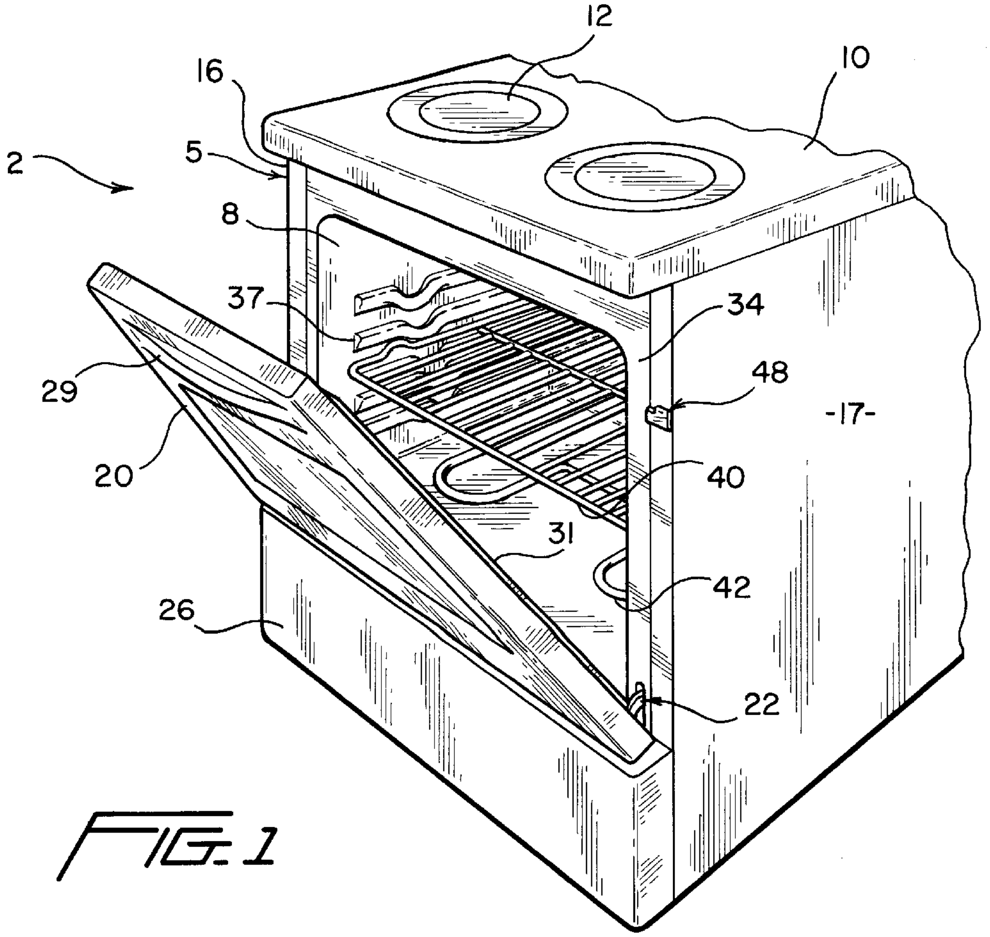
FIG. 1 is partial perspective view of a domestic oven adapted for use in dehydrating food products in accordance with the present invention.

With initial reference to FIG. 1, a domestic oven adapted for use in dehydrating food products in accordance with the present invention is generally indicated at 2. Oven 2 is shown to include a cabinet 5 that supports an oven cavity 8. In this embodiment, oven 2 is depicted as a range that is adapted to be supported upon a planar floor surface, typically in the kitchen of a household. However, as will become more fully evident below, it should be realized that the present invention is applicable to various types of ovens, including conventional wall mounted ovens as well. In any event, oven 2 as shown also includes a range top 10 provided with a plurality of heating elements 12. Heating elements 12 can also take various forms, including electric coils or gas burners, depending upon the particular style of oven 2. Oven 2 also includes side panels 16 and 17, a door 20 that is mounted through hinge plates (one of which is indicated at 22) for pivotal movement relative to oven cavity 8 between open and closed positions, and a lower panel 26. In a manner known in the art, lower panel 26 can define a front for a slidable storage drawer arranged beneath oven cavity 8.

Door 20 is shown to include a handle 29 for grasping and shifting of door 20 relative to oven cavity 8 and has attached to a rear face thereof a seal 31 which is adapted to extend about an annular face portion 34 that defines the open frontal portion (not separately labeled) of oven cavity 8. At this point, it should be noted that face portion 34 can be formed as a single member with oven cavity 8 or oven cavity 8 can be simply integrated with face portion 34 such as through a crimping or welding process. What is simply important to note is that door 20 extends across the open frontal portion of oven cavity 8 and is movable between a fully closed position, wherein seal 31 abuts face portion 34 in order to create a heat seal between oven cavity 8 and door 20, and an open position, wherein access to within oven cavity 8 is permitted. Oven cavity 8 is formed with a plurality of vertically spaced runners 37 for use in slidably supporting one or more racks 40. Furthermore, a heating element 42 is positioned at the bottom of oven cavity 8 for use in heating oven cavity 8. Although heating element 42 is shown to constitute an electric heating element, it should be readily understood that various types of known heating arrangements can be utilized, including gas burners. As is well known, another heating element is typically mounted along the top wall (not labeled) of oven cavity 8, such as for use in during a broiling mode of operation.

To this point, it should be realized that all of the above-described structure of oven 2 is conventional in the art, does not form part of the present invention and has been described for the sake of completeness only. Instead, the present invention is directed to adapting oven 2 for use in dehydrating food products. For this purpose, it is necessary to prevent door 20 from sealingly closing the open frontal portion of oven cavity 8 in order to permit moisture to escape cavity 8 when food items to be dried are heated upon rack 40. However, it is important to assure that door 20 is only maintained open a minimal amount which will allow for escape of humid air, while still minimizing the heat loss from oven cavity 8. In addition, it is necessary to assure that a relatively low temperature will be maintained within oven cavity 8 for extended periods of time to accomplish the food drying process. As indicated above, the most effective drying time and temperature will depend upon the particular food item being dried, as well as consumer preferences.

Figure 2:
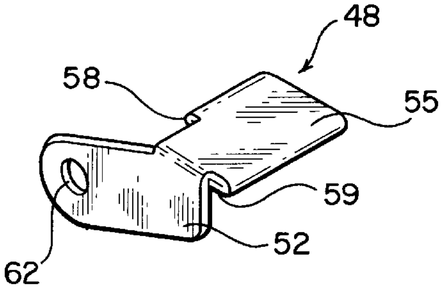
FIG. 2 is an upper left side perspective view of a spacer element incorporated in the oven of FIG. 1.
Figure 3:
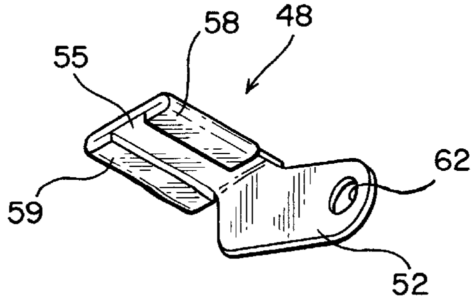
FIG. 3 is a lower right perspective view of the spacer element of FIG. 2.

In order to effectively utilize domestic oven 2 in dehydrating food products in accordance with the preferred embodiment of the present invention, a spacer element 48 is incorporated as part of oven 2. As best illustrated in FIGS. 2 and 3, spacer element 48 preferably takes the form of a bracket having a first leg 52 and a second leg 55. As shown, second leg 55 extends generally perpendicular to first leg 52 and has end portions which are in-turned at 58 and 59 in order to establish smooth edges and to stiffen second leg 55. In addition, first leg 52 is provided with an aperture 62. In the preferred embodiment, spacer element 48 is formed from steel, but it should be realized that other materials could also be utilized.

Figure 4:
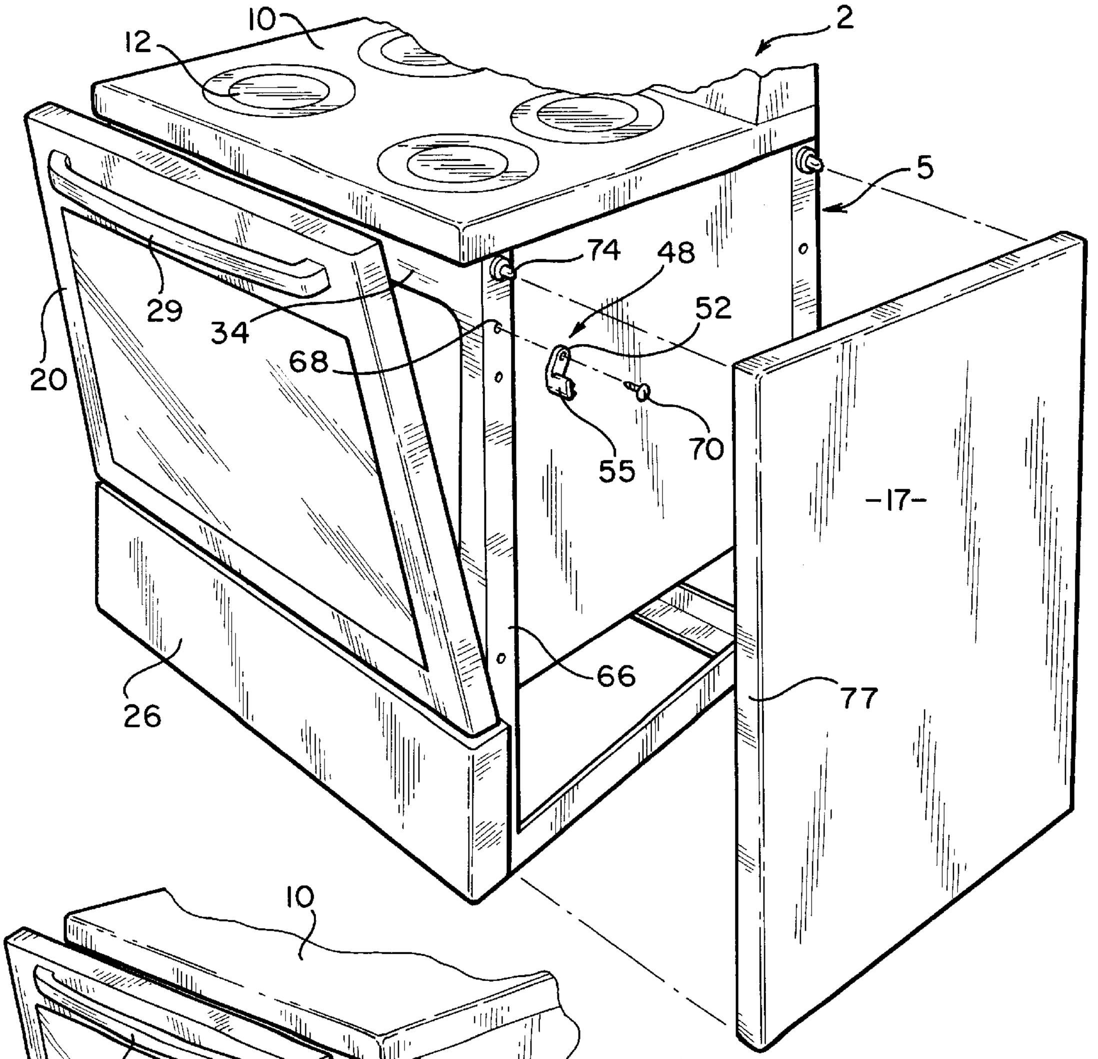
FIG. 4 is a partial exploded, perspective view of the oven of FIG. 1.

The manner in which spacer element 48 is mounted in accordance with the preferred embodiment of the invention will now be discussed with reference to FIG. 4. As shown in this figure, cabinet 5 includes a vertically extending support 66 that is provided with a hole 68 at a position spaced below top 10. Spacer element 48 is adapted to be attached to oven 2 at hole 68 by means of a mechanical fastener, such as a sheet metal screw 70, which extends through aperture 62 in first leg 52 and is threadably secured within hole 68 of support 66. As shown, this attachment is accomplished with second leg 55 projecting away from oven cavity 8. Once fastener 70 is secured, spacer element 48 is permitted to freely pivot relative to cabinet 5 and oven cavity 8. Next, side panel 17 is mounted to cabinet 5, preferably through the use of various front locators such as that indicated at 74, as well as mechanical fasteners (not shown) at the back section of oven 2. When side panel 17 is mounted, it is assured that second leg 55 of spacer element 48 is positioned along a frontal surface section 77 of side panel 17. Therefore, when spacer element 48 and side panel 17 are attached to cabinet 5, oven 2 assumes the condition shown in FIG. 1, wherein spacer element 48 is arranged in a de-activated position.

Figure 6:
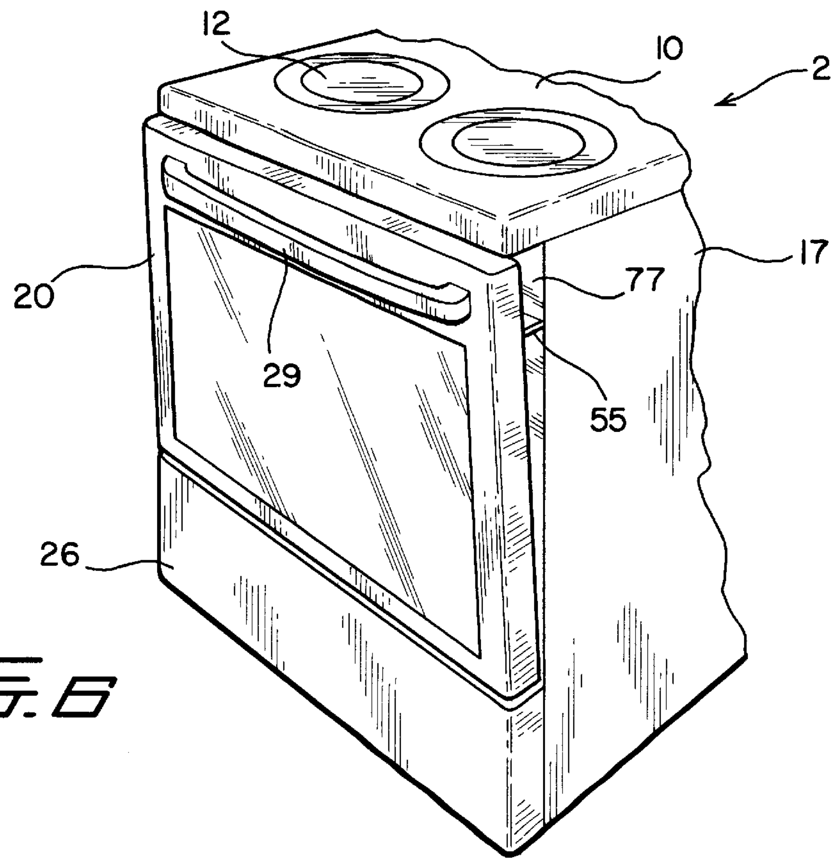
FIG. 6 is a partial perspective view of the oven of FIG. 1 with the door thereof in an activated, drying mode position.
Figure 7:
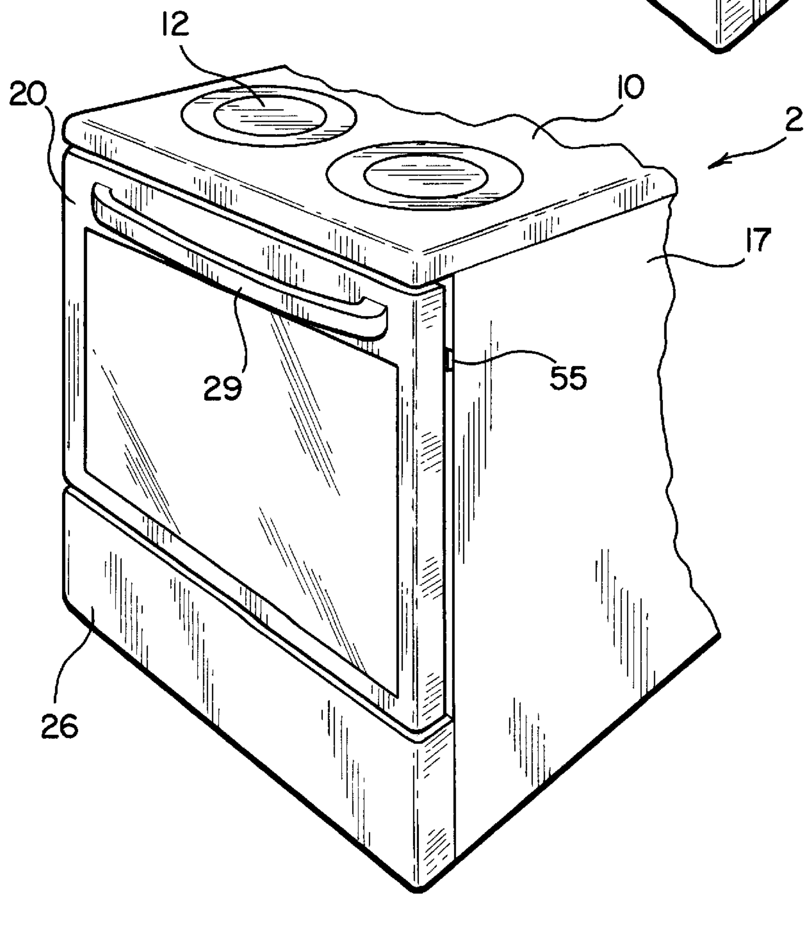
FIG. 7 is a partial perspective view similar to that of FIG. 6, but with the oven door fully closed.

Once assembly is completed, spacer element 48 is permitted to pivot relative to the remainder of oven 2 from the de-activated position shown in FIG. 1, wherein door 20 is permitted to assume a fully closed position with terminal side edges (not separately labeled) of door 20 overlying side panel 17 as perhaps best shown in FIG. 7. In other words, FIG. 7 illustrates spacer element 48 in the identical condition shown in FIG. 1, but with door 20 in a fully closed position wherein seal 31 engages face portion 34 to effectively close off and seal the open frontal portion of oven cavity 8. In this position, second leg 55 is arranged substantially parallel to frontal surface section 77 of side panel 17. When it is desired to utilize oven 2 in dehydrating food products, the food products are simply placed upon rack 40 and spacer element 48 is pivoted to the activated position shown in FIG. 5 wherein second leg 55 projects outward from frontal surface section 77 towards door 20. Upon continued closing of door 20, oven 2 will assume the position shown in FIG. 6 wherein door 20 is prevented from assuming the fully closed position as spacer element 48 is interposed between door 20 and side panel 17. In this condition, spacer element 48 maintains door 20 slightly ajar from the fully closed position in order to just break the seal between door 20 and oven cavity 8. Maintaining door 20 in this slightly open condition enables the humid air to escape from oven cavity 8 while still assuring that the majority of the heat generated within oven cavity 8 will not be lost.

Figure 5:
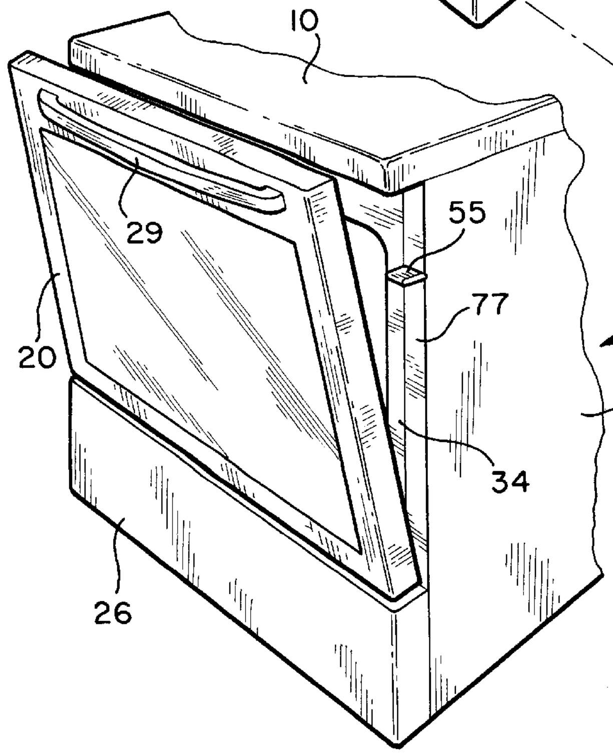
FIG. 5 is a partial perspective view of the oven of FIG. 1 with a door thereof in a partially open state.

Further opening of door 20 during the drying mode of operation has been found to drastically reduce the effectiveness of the dehydration process. For instance, FIG. 5 illustrates door 20 in a position typically maintained when the oven 2 is utilized in a broil mode. It is known to provide a detent associated with hinge 22 for maintaining door 20 in such a position. However, placing door 20 in this position for broiling operations is specifically designed to allow a substantial amount of heat to exit oven cavity 8. Therefore, spacer element 48 must maintain door 20 open only an amount which just prevents sealing of the open frontal portion of oven cavity 8 in order to permit oven 2 to be effectively used for dehydrating food products. Of course, the particular structure of oven 2, including the arrangement of the hinges 22 and the distance which seal 31 projects from door 20 in the open position, will affect the actual distance which must be established by spacer element 48 in order to just break the door seal. In addition, given the location of hinges 22, the vertical position at which spacer element 48 is placed will also affect the size thereof. Therefore, the specific dimensions of the spacer element 48 will depend upon the particular configuration of oven 2, but will generally range between one-half and three-quarter inches. It is merely important that the seal be broken a minimal amount in accordance with the present invention and therefore the exact location of spacer element 48 and configuration thereof can vary without departing from the spirit of the invention. If oven 2 incorporates a light switch (not shown), spacer element 48 would preferably be designed to hold door 20 at a position which would just break the seal, yet which would still enable door 20 to depress the light switch enough to cause the light within oven cavity 8 to go off. If the light switch was linked to some type of convection fan for oven cavity 8, engaging the switch in this manner would also enable the fan to work appropriately.

In accordance with the preferred embodiment shown wherein spacer element 48 constitutes a bracket pivotally attached to cabinet 5, it is preferable to arrange spacer element 48 such that second leg 55 is arranged above aperture 62 and hole 68 when in the activated position and, due to gravity, will automatically assume the de-activated position. More specifically, spacer element 48 is preferably designed such that it must be manually shifted to the activated position shown in FIG. 5 and held in that position until spacer element 48 is sandwiched between door 20 and side panel 17 as shown in FIG. 6. When door 20 is further opened from the position shown in FIG. 6, spacer element 48 will automatically assume the de-activated position depicted in FIG. 1. With this arrangement, spacer element 48 cannot be inadvertently left in the activated position, thereby assuring that oven cavity 8 can be properly sealed when later used in another mode of operation.

At this point, it should be realized that the present invention enables a conventional oven to be easily adapted for use in selectively dehydrating food products by simply incorporating structure which will maintain door 20 slightly ajar from a fully closed position in order to just break a seal between door 20 and oven cavity 8. However, it should also be realized that the particular construction of spacer element 48 and the manner in which it is attached to the remainder of oven 2 can vary in accordance with the present invention while still performing the desired function. Forming spacer element 48 as a bracket that is simply pivotally attached through the use of a mechanical fastener to cabinet 5 is preferred since it represents a modification that can be easily incorporated into the manufacture of oven 2 at minimal cost. However, more elaborate arrangements could be utilized, such as incorporating a solenoid controlled spacer element that would project into the zone between door 20 and oven cavity 8 upon simply selecting a drying mode of operation for oven 2 through the use of a manual selector button. Such a solenoid controlled arrangement could be simply mounted within side panel 17 and project through frontal section 77. In addition, hinge 22 could be modified to provide for an additional detent position for use in the drying mode of operation. Of course, other equivalent arrangements may also be considered by one of ordinary skill in the art after reading this disclosure. Therefore, broadly speaking, it is only important that the oven 2 incorporate some structure to prevent door 20 from assuming the fully closed position by an amount which just prevents sealing of the upper frontal portion of cavity 8. It is also important that this structure be incorporated as part of oven 2, either directly during the manufacturing process or as a retro-fit unit, as opposed to the possibility of simply inserting a foreign object between door 20 and oven cavity 8 to perform this function as this latter arrangement could be considered quite hazardous.

Figure 8:
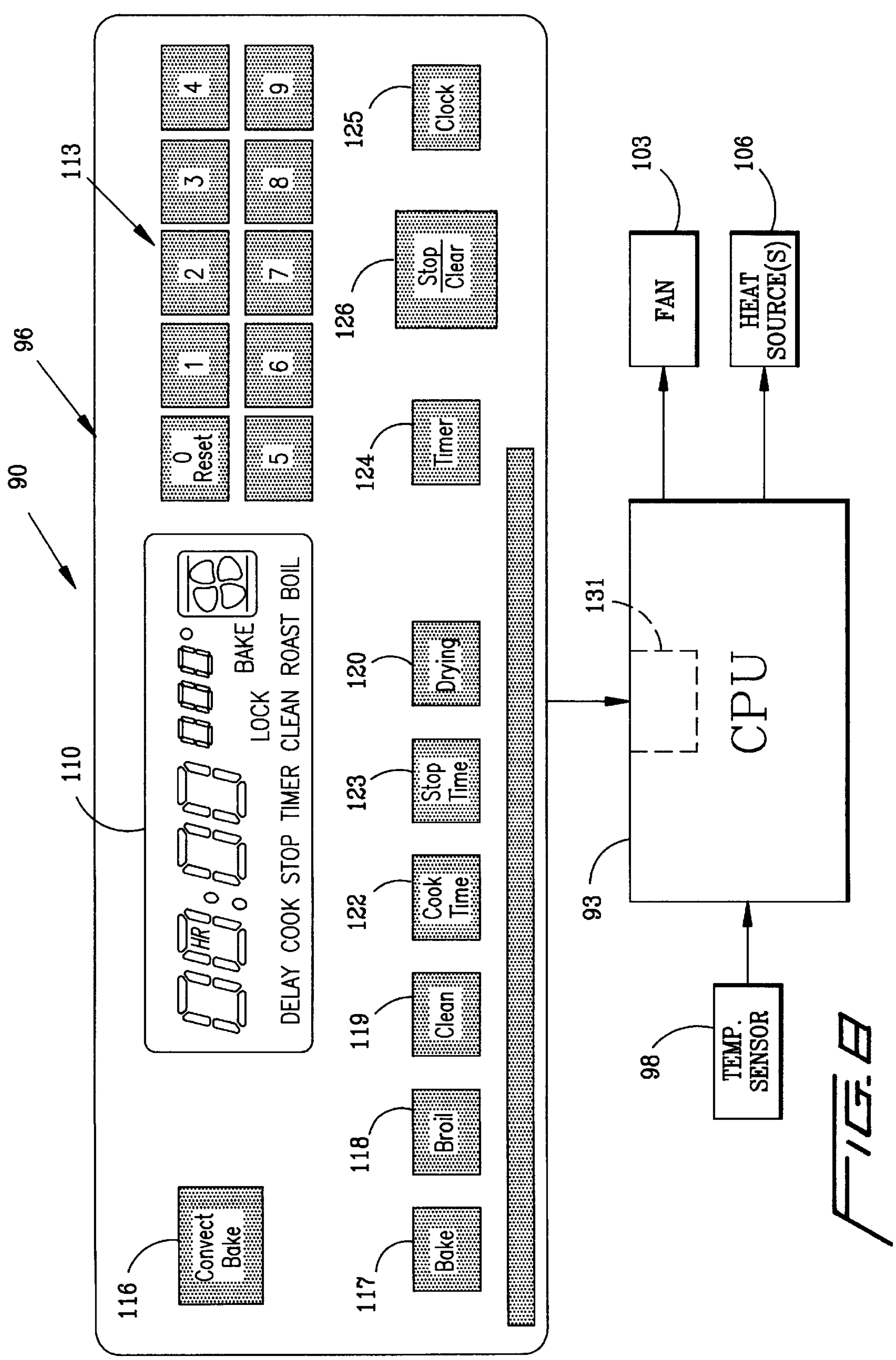
FIG. 8 is a schematic of a control system incorporated in a preferred embodiment of the invention.

The present invention also incorporates a system, generally indicated at 90 in FIG. 8, for controlling the operation of oven 2 during the dehydration and other modes of operation. As shown, control system 90 includes a central, electronic microprocessor or CPU 93 that receives input control signals from a control pad 96 and an oven cavity temperature sensor 98. CPU 93 utilizes these input signals to control the operation of a fan 103 and one or more heat sources indicated at 106. Of course, these heat sources would include heating element 42, as well as any broiler element mounted within oven cavity 8. The components and operation of control system 90 for performing baking, broiling, cleaning and other functions for oven 2 are known in the art and therefore do not constitute part of the present invention. As is known, control pad 96 incorporates a display 110, a numeric punch pad 113, various operating mode selector buttons 116–120, numerous time control related buttons 122–125 and a stop/clear button 126. Due to the scope of the present invention, of only real interest to this disclosure is the functioning of control system 90 based on this selection of a drying mode for oven 2 through the use of operating mode selector button 120.

The user of oven 2 in dehydrating food products will be prompted to enter a desired temperature through a numeric punch pad 113 upon pressing of drying mode selector button 120. To set the temperature, the user can either enter a specific temperature using the individual numbers of punch pad 113 or press the zero "0" button which, in the preferred embodiment, is preset to a generally, universally useable temperature, such as 140° F. Preferably, CPU 93 includes an override circuit 131 that assures that the selected temperature is within a predetermined temperature range for operating in the dehydration mode. In accordance with the present invention, the predetermined temperature range is set to 100° F–200° F. Therefore, if the operator enters a desired temperature below 100° F. or above 200° F., control system 90 will establish a default temperature of either 100° F. or 200° F respectively. This function can be achieved in various ways, such as providing a simple algorithm that is run after the desired temperature is established by the user, with the algorithm simply allowing the desired temperature to be used if within the predetermined temperature range or establishing a default operating temperature based on whether the inputted temperature is above or below the predetermined, permissible temperature range. In addition, control system 90 can provide an audible or visual indication to the user that this default mode has been entered, such as by providing audible beeps or the like. The timer can also be set for a desired drying time which will typically vary between 1 and 36 hours depending upon the water and sugar content of the food, size of the food pieces, amount of food being dried, humidity in the air and the like. In addition, such drying times will fluctuate based on personal preference, but certainly can be readily determined based on experimentation and past experience.

It is also desirable in accordance with the present invention to have CPU 93 activate fan 104 during the drying process. If an electric oven is utilized, it is preferable to actuate fan 103 directly upon the start of the drying operation. If a multi-speed fan is provided, the low speed of the fan will be selected. If a gas unit is being utilized, it is preferable to provide a time delay for the starting of fan 103. A suitable delay time is in the order of 5 minutes. Fan 103 is preferably activated to provide convection within oven cavity 8 in order to assure uniform drying of the surface area of the food products, while also assisting in the escape of moisture from within oven cavity 8.

Although described with respect to a preferred embodiment of the present invention, it should be readily understood that various changes and/or modifications can be made to the present invention without departing from the spirit thereof. In general, the invention is only intended to be limited by the scope of the following claims.

I/we claim:

1. An oven adapted for selective use in dehydrating food products comprising:

an oven cavity having an open frontal portion to enable access to within the oven cavity;

a door pivotally mounted for movement between a fully closed position, wherein the door extends across the open frontal portion of the oven cavity, and an open position, wherein access to within the oven cavity is permitted;

a seal arranged between the door and the oven cavity for sealing the open frontal portion of the oven cavity when the door assumes the fully closed position;

a spacer element attached for movement, relative to the oven cavity, between a de-activated position, wherein the door is permitted to assume the fully closed position, and an activated position, wherein the spacer member prevents the door from assuming the fully closed position by an amount which just prevents sealing of the open frontal portion of the oven cavity such that the door is maintained open a minimal amount which will allow for escape of humid air from the oven cavity in order to permit the oven to be effectively used for dehydrating food products.

2. The oven according to claim 1, further comprising an oven cabinet which incorporates the oven cavity, said spacer element being mounted to the oven cabinet for movement relative to the oven cavity.

3. The oven according to claim 2, wherein the spacer element is pivotally attached to the oven cabinet.

4. The oven according to claim 3, wherein the oven cabinet includes a side panel having a frontal surface section, said spacer element including a portion interposed between the door and the frontal surface section of said side panel.

5. The oven according to claim 4, wherein the spacer element comprises a bracket having a first leg that is pivotally attached to the oven cabinet and a second leg which constitutes the portion interposed between the door and the frontal surface section of said side panel, wherein the second leg is arranged substantial parallel to the frontal surface section of the side panel when in the de-activated position and projects outward from the frontal surface section towards the door when pivoted to the activated position.

6. The oven according to claim 5, further comprising: means for pivotally mounting the spacer element to the oven cabinet with the spacer element being automatically movable from the activated position to the de-activated position due to gravity.

7. The oven according to claim 1, further comprising: means for automatically shifting the spacer element from the activated position to the de-activated position upon opening of the door.

8. The oven according to claim 1, further comprising: control means for establishing a dehydration mode of operation for the oven, said control means including a manual dehydration mode selector and means for setting a desired dehydration temperature.

9. The oven according to claim 8, wherein the control means further includes means for overriding the setting means whenever the desired dehydration temperature is outside a predetermined temperature range and the oven is operating in the dehydration mode.

10. The oven according to claim 9, wherein the predetermined temperature range is 100° F.–200° F.

11. An oven adapted for selective use in dehydrating food products comprising:

an oven cavity having an open frontal portion to enable access to within the oven cavity;

a door pivotally mounted for movement between a fully closed position, wherein the door extends across the open frontal portion of the oven cavity, and an open position, wherein access to within the oven cavity is permitted;

means for selectively maintaining the door slightly ajar from the fully closed position so as to just break a seal between the door and the oven cavity such that the door is maintained open a minimal amount which will allow for escape of humid air from the oven cavity in order to effectively utilize the oven for dehydrating food products.

12. The oven according to claim 11, wherein the maintaining means is movable between a de-activated position in which the door is permitted to assume the fully closed position, and an activated position in which the maintaining means prevents the door from assuming the fully closed position.

13. The oven according to claim 12, further comprising: means for automatically shifting the maintaining means from the activated position to the de-activated position upon opening of the door.

14. The oven according to claim 12, wherein the oven includes a frontal surface section that is juxtapose the door when the door assumes the fully closed position and said maintaining means comprises a spacer element having a portion interposed between the door and the frontal surface section.

15. The oven according to claim 14, wherein the spacer element includes a first leg pivotally mounted for movement relative to the oven cavity and a second leg which constitutes the portion interposed between the door and the frontal surface section, wherein the second leg is arranged substantial parallel to the frontal surface section when in the de-activated position and projects outward from the frontal surface section towards the door when pivoted to the activated position.

16. The oven according to claim 15, further comprising: means for pivotally mounting the spacer element to the oven cabinet with the spacer element being automatically movable from the activated position to the de-activated position due to gravity.

17. The oven according to claim 1, further comprising: control means for establishing a dehydration mode of operation for the oven, said control means including a manual dehydration mode selector and means for setting a desired dehydration temperature.

18. The oven according to claim 17, wherein the control means further includes means for overriding the setting means whenever the desired dehydration temperature is outside a predetermined temperature range and the oven is operating in the dehydration mode.

19. The oven according to claim 18, wherein the predetermined temperature range is 100° F.–200° F.

20. The oven according to claim 17, further comprising: a fan for circulating air within the oven cavity when the oven is in the dehydration mode.

21. An oven adapted for selective use in dehydrating food products comprising:

an oven cavity having an open frontal portion to enable access to within the oven cavity;

an oven cabinet which incorporates the oven cavity, said oven cabinet including a side panel having a frontal surface section;

a door pivotally mounted for movement between a fully closed position, wherein the door extends across the open frontal portion of the oven cavity, and an open position, wherein access to within the oven cavity is permitted;

a seal arranged between the door and the oven cavity for sealing the open frontal portion of the oven cavity when the door assumes the fully closed position; and a spacer element pivotally attached to the oven cabinet for movement, relative to the oven cavity, between a de-activated position, wherein the door is permitted to assume the fully closed position, and an activated position, wherein a portion of the spacer member is interposed between the door and the frontal surface section of the side panel to prevent the door from assuming the fully closed position, said spacer element including a bracket having a first leg that is pivotally attached to the oven cabinet and a second leg which constitutes the portion interposed between the door and the frontal surface section of said side panel, wherein the second leg is arranged substantial parallel to the frontal surface section of the side panel when in the de-activated position and projects outward from the frontal surface section towards the door when pivoted to the activated position.

22. The oven according to claim 21, further comprising: means for pivotally mounting the spacer element to the oven cabinet with the spacer element being automatically movable from the activated position to the de-activated position due to gravity.

23. The oven according to claim 21, further comprising: means for automatically shifting the spacer element from the activated position to the de-activated position upon opening of the door.

24. The oven according to claim 21, further comprising: control means for establishing a dehydration mode of operation for the oven, said control means including a manual dehydration mode selector and means for setting a desired dehydration temperature.

25. The oven according to claim 24, wherein the control means further includes means for overriding the setting means whenever the desired dehydration temperature is outside a predetermined temperature range and the oven is operating in the dehydration mode.

* * * * *